US007982774B2

(12) United States Patent
Tsunashima

(10) Patent No.: US 7,982,774 B2
(45) Date of Patent: Jul. 19, 2011

(54) IMAGE PROCESSING APPARATUS AND IMAGE PROCESSING METHOD

(75) Inventor: Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 908 days.

(21) Appl. No.: 11/218,613

(22) Filed: Sep. 6, 2005

(65) Prior Publication Data

US 2006/0056702 A1    Mar. 16, 2006

(30) Foreign Application Priority Data

Sep. 13, 2004    (JP) ................. 2004-266012

(51) Int. Cl.
*H04N 5/228* (2006.01)
*H04N 9/47* (2006.01)
*H04N 7/18* (2006.01)
*G06K 9/68* (2006.01)

(52) U.S. Cl. ............... 348/208.6; 348/208.99; 348/143; 348/152; 348/155; 382/219

(58) Field of Classification Search ............ 348/208.6, 348/208.14; 375/240.12, 240.16; 382/107, 382/219–221
See application file for complete search history.

(56) References Cited

U.S. PATENT DOCUMENTS

| 5,703,644 | A | * | 12/1997 | Mori et al. ............... 348/363 |
| 5,712,474 | A | * | 1/1998 | Naneda .................. 250/208.1 |
| 5,974,159 | A | * | 10/1999 | Lubin et al. .............. 382/106 |
| 6,088,468 | A | * | 7/2000 | Ito et al. ................. 382/103 |
| 6,108,033 | A | * | 8/2000 | Ito et al. ................. 348/152 |
| 6,404,455 | B1 | * | 6/2002 | Ito et al. ................. 348/169 |
| 6,421,462 | B1 | * | 7/2002 | Christian et al. .......... 382/219 |
| 6,707,486 | B1 | * | 3/2004 | Millet et al. ............. 348/155 |
| 7,215,795 | B2 | * | 5/2007 | Ito et al. ................. 382/103 |
| 2003/0117516 | A1 | * | 6/2003 | Ishida et al. ............. 348/348 |
| 2004/0080615 | A1 | * | 4/2004 | Klein et al. .............. 348/143 |
| 2004/0223548 | A1 | * | 11/2004 | Kato et al. ............ 375/240.16 |
| 2005/0074141 | A1 | * | 4/2005 | Tsunashima .............. 382/103 |

FOREIGN PATENT DOCUMENTS

| JP | 6-169424 | | 6/1994 |
| JP | 2002-32876 | | 1/2002 |
| JP | 2003-346156 | * | 5/2003 |
| JP | 2004-13615 | | 1/2004 |
| JP | 2005-156852 | | 6/2005 |

OTHER PUBLICATIONS

Chris Stauffer, et al., "Adaptive background mixture models for real-time tracking", 7 pages.

* cited by examiner

*Primary Examiner* — Sinh Tran
*Assistant Examiner* — Christopher K Peterson
(74) *Attorney, Agent, or Firm* — Oblon, Spivak, McClelland, Maier & Neustadt, L.L.P.

(57) ABSTRACT

The present invention provides an image processing apparatus detects only an object to be detected by removing a disturbance, such as the shaking of trees by using a very simple process and parameter. The image processing apparatus includes a reference image storing unit for storing a plurality of past image data photographed by a video input unit as reference image data, and an image moving object detecting unit for detecting the difference of pixels or difference in small areas between the image data photographed by the video input unit and each of the plurality of reference image data stored by the reference image storing unit and detecting a moving object in the image data based on the continuity or appearance probability of the difference.

9 Claims, 5 Drawing Sheets

The case there is no body t'Δt

The case there is body

The case there is fluctuation

IMAGE PROCESSING APPARATUS AND IMAGE PROCESSING METHOD

CROSS REFERENCES TO RELATED APPLICATIONS

The present invention contains subject matter related to Japanese Patent Application JP 2004-266012 filed in the Japanese Patent Office on Sep. 13, 2004, and Japanese Patent Application JP 2005-236033 filed in the Japanese Patent Office on Aug. 16,2005, the entire contents of which being incorporated herein by reference.

BACKGROUND OF THE INVENTION

1. Field of the Invention

This invention relates to an image processing apparatus and an image processing method for detecting a moving object region in an image photographed by a video photographing unit, such as a camera.

2. Description of the Related Art

Heretofore, in order to monitor or trace an object, such as a person, a vehicle, in a video captured by a video photographing unit, such as an ITV camera, it is necessary to detect the object in the video. For example, when applied to a monitoring apparatus using the ITV camera, it is considered to create a system that photographs a place desired to be monitored, such as a restricted area, by a camera, detects the presence or absence of an object in the video, and alarms when the object enters the monitored place. Further, it can be also applied to the control of a flow of passerby, the market research, etc. by tracing moving persons and surveying the flow of passerby at a place such as a department store, a station, etc. where many persons go in and out.

When an object enters into the video, the brightness of an object region, that is, the luminance value of the object region in the image changes. Therefore, the object can be detected by detecting a region as a differential region in which there is a difference in the luminance value in the image. As a technology for detecting the differential region of image, there is a difference detecting method using a difference between frames and a background difference method using a background image. In the difference between frames, the difference is detected by calculating the difference of the luminance between the image photographed at the present time and the image photographed a unit time before, and it is judged that there is the object in the region having the difference. However, by the difference between two frames of the image photographed at the present time and the image photographed the unit time before, a disturbance, such as the shaking of tree, the waving of water surface or the fluctuation of a flag, etc., is also detected.

On the other hand, in the background difference method, the object region is detected by previously recording an image of the object which is not moved as a background image, and comparing the image photographed at the present time with the background image.

Even in the background difference method, similarly to the difference detecting method using a difference between frames, it is difficult to deal with the shaking of the tree, and the like.

As a technique for removing the object, such as the shaking of the tree, except an object to be detected, for example, there is a technique of analyzing the image in which the object except the object to be detected had appeared in the past and holding it as a plurality of probability distributions. For example, when there is the shaking of the tree, by holding two appearance probabilities of the leaf part and the part at the rear of the leaf as the backgrounds, even if either the leaf part and the part at the rear thereof is appeared, it can be put as the background (for example, refer to a Non-patent Document 1: C.Stuffer, W.E.L. Grimson, "adaptive background mixture models for real-time tracking").

When the difference values of the image photographed at the present time and the image photographed in the past are binarized by a threshold value processing, a monitoring apparatus which deals with the fluctuation by creating a background image in which the accumulated result of the past difference values is changed to the original threshold value has also been proposed (for example, refer to Patent Document 1: Jpn. Pat. Appln. Laid-Open Publication No. 2000-156852).

SUMMARY OF THE INVENTION

However, in the technique of the above-mentioned Non-patent Document 1, since there exist several parameters, such as the number of probability distribution and the updating method thereof and the like, to be held as the background, it has been necessary to tune the plurality of the parameters with respect to each scene.

Furthermore, in the technique of the Patent Document 1, when the change of the luminance value due to the shaking of the tree or the like is large, the threshold value becomes excessively large, and hence there is a possibility that a detection leakage may occur when the object enters.

Therefore, in view of the above-mentioned conventional problems, it is desirable to detect only an object to be detected by removing a disturbance, such as the shaking of the tree, by using a very simple process and parameter.

Another object of the present invention and the concrete advantages obtained by the present invention will further be clarified from the description of the embodiments of the present invention which will be described below.

In the present invention, by comparing with several sheets of past image groups, the disturbance, such as the shaking of the tree is removed from the continuity of the difference value, and only the moving object area is detected.

More specifically, the image processing apparatus according to the present invention includes a reference image storing unit for storing a plurality of past image data photographed by a video input unit as reference image data, and an image moving object detecting unit for detecting the difference of pixels or difference in small area between the image data photographed by the video input unit and each of the plurality of reference image data stored by the reference image storing unit and detecting a moving object in the image data based on the continuity or appearance probability of the difference.

The image processing apparatus according to the present invention further includes, for example, an image correcting unit for correcting a blurring, and luminance of the image by using the image data and the reference image data stored in the reference image storing unit and extracting an object area by using the image corrected by the image correcting unit.

Further, in the image processing apparatus according to the present invention, for example, the image correcting unit detects the blurring between the image data and each of the plurality of reference image data stored by the reference image storing unit, and performs a blur correction.

Further, in the image processing apparatus according to the present invention, for example, the image correcting unit detects the blurring between temporally continuous two reference image data when detecting the blurring between the image data and each of the plurality of reference image data stored by the reference image storing unit, sets the reference of the blur correction by accumulating the blurring, detects the blurring by performing a blur detection of minute section from the reference value of the set blur correction, thereby performing the blur correction.

Further, the image processing apparatus according to the present invention further includes, for example, a background image storing unit for storing another image that is obtained by photographing the same scene beforehand, as background image data, a background difference processing unit that detects the difference between the image data photographed by the video input unit and the background image data stored by the background image storing unit, and a background difference unit that compares the moving object area detected by the image moving object detecting unit with the background image data stored by the background image storing unit, and erasing a residual image generated when the moving object is detected by the image moving object detecting unit.

An image processing method according to the present invention includes the steps of storing a plurality of past image data photographed by a video input unit as reference image data, and detecting the difference of pixels or difference in small areas between the image data photographed by the video input unit and each of the plurality of reference image data stored, and further detecting a moving object in the image data based on the continuity or appearance probability of the difference.

According to the present invention, by observing the continuity of the difference value between the image of the present time and the past image group of the held frames of the past number in the object detection by the difference process between the frames, only the object enters into the image can be detected by removing the disturbance, such as the shaking of the tree and the waving of water surface. In this case, a robust object detection in response to the scene can be made only by giving two parameters, that is, the number of the storing frames and the time in which the state that the difference value exceeds a threshold value continues.

DETAILED DESCRIPTION OF THE PREFERRED EMBODIMENTS

Hereinafter, embodiments of the present invention will be described with reference to the accompanying drawings. Note that, the present invention is not limited to the description below, and it can be modified and altered without departing from the spirit and scope of the invention.

In the present invention, only an object to be detected is detected by removing the disturbance, such as the shaking of a tree, by using a very simple process and parameter.

Figure 1:
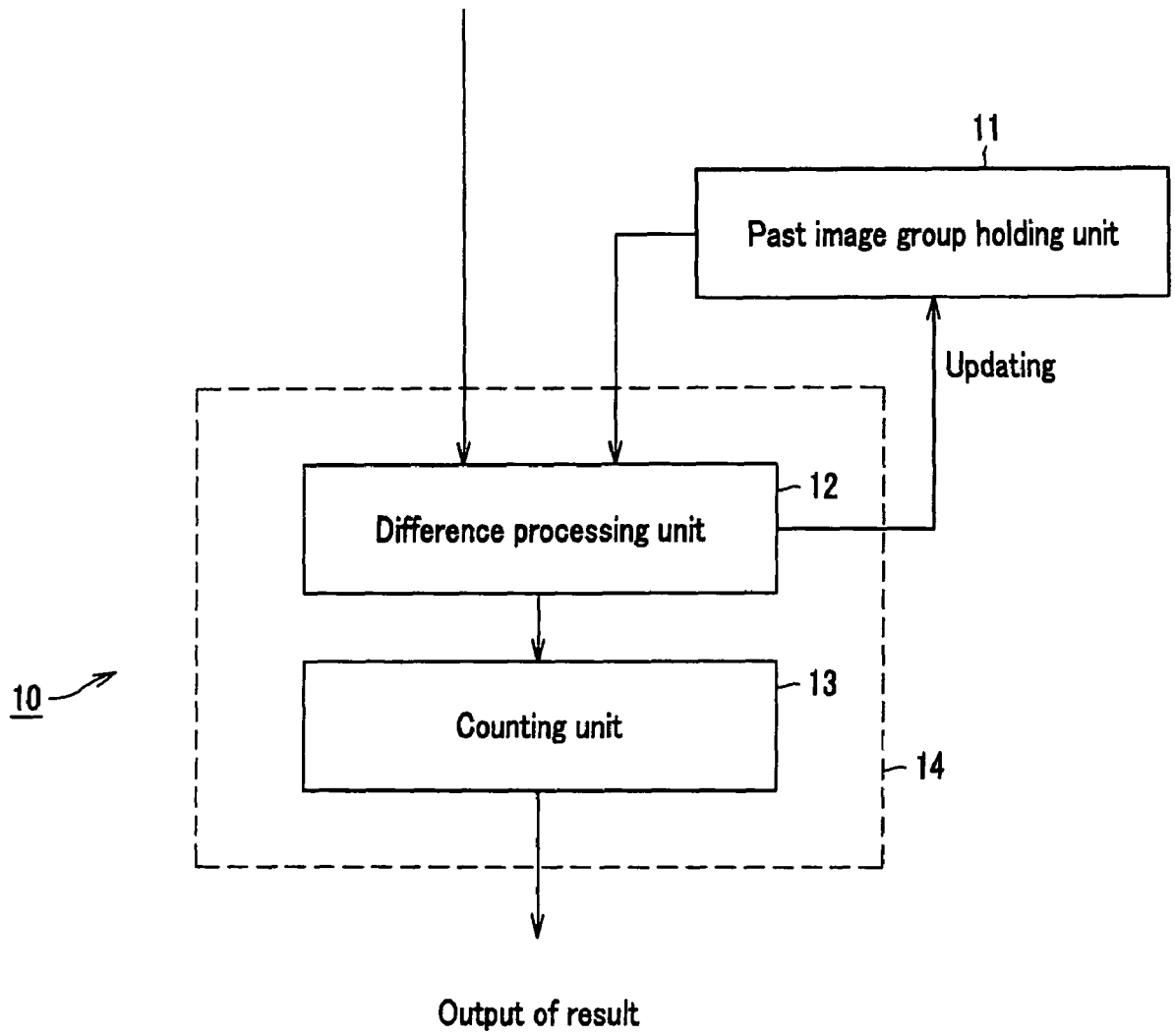
FIG. 1 is a block diagram showing a structural example of an image processing apparatus according to the present invention.

An image processing apparatus 10 according to the present invention includes, for example, as shown in FIG. 1, a past image group holding unit 11 for storing a plurality of past image data photographed by a video input unit, such as a camera, as reference image data, and an image moving object detecting unit 14 for detecting the difference of pixels or difference in small areas between the image data photographed by the video input unit and each of the plurality of reference image data stored by the past image group holding unit 11 and detecting a moving object in the image data based on the continuity or appearance probability of the difference.

In the image processing apparatus 10, the images of the frames of the past number photographed by the video photographing unit are held as the past image group in the past image group holding unit 11, the difference of the luminance of the image photographed by the image moving object detecting unit 14 at the present time and the past image group are calculated by a difference processing unit 12, the temporal continuity of the difference value is counted by a counting unit 13, and the counted value is outputted as an image moving object detection result.

Figure 2A:
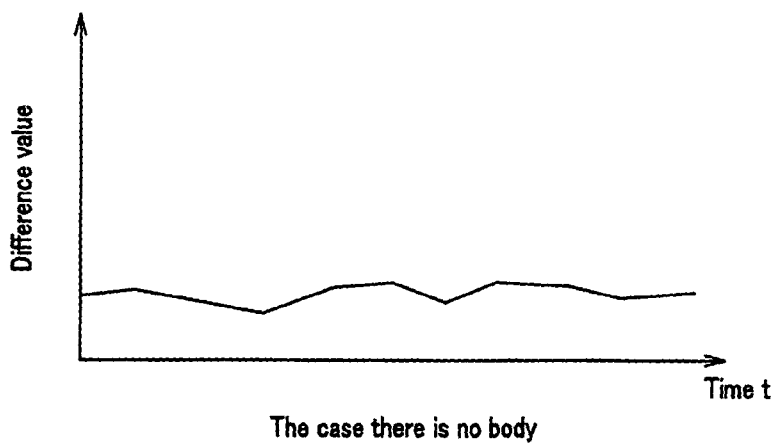
FIGS. 2A, 2B and 2C are graphs showing the result of calculating the difference value between the image of the present time and the past image group of the frames of the past number as the change of the difference values in coordinates with the image by plotting time in the abscissa axis and difference value in the ordinate axis.
Figure 2B:
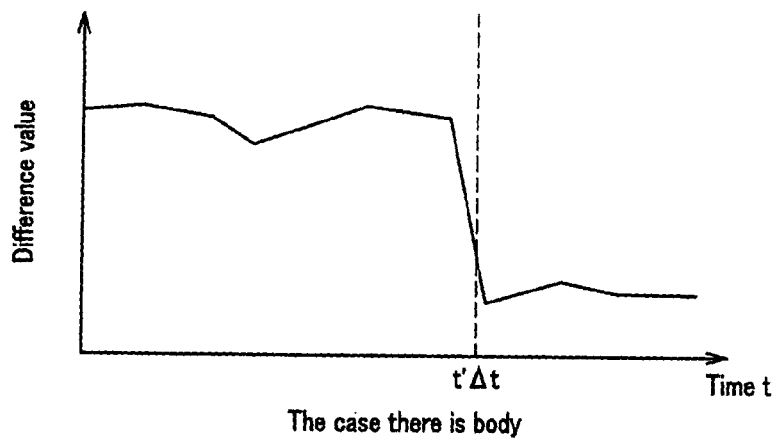
Figure 2C:
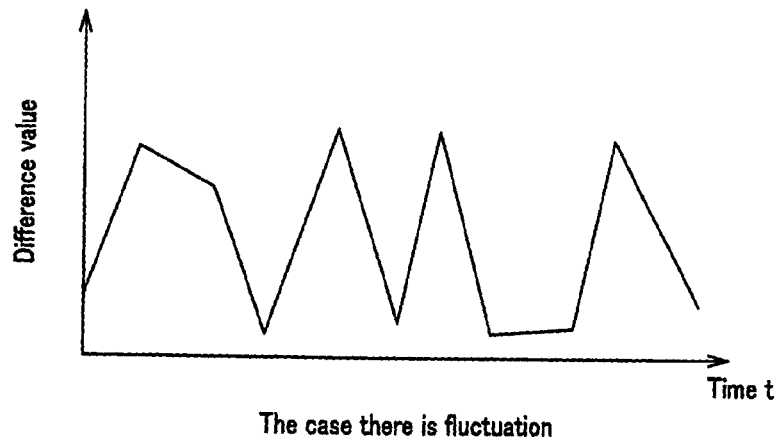

More particularly, FIG. 2 shows the result of calculating the difference value between the image of the present time and the past image group of the frames of the past number by the graph as the change of the difference value in the coordinates in the image by plotting time in the abscissa axis and difference value in the ordinate axis. When the object does not exist in the certain coordinates in the image, as shown in FIG. 2A, the difference value maintains a very small state continuously. Next, when the object enters the certain coordinates in the image, as shown in FIG. 2B, the difference value changes. When the object enters at a time t−Δt, where t means the present time and the object exists at present, before the time t−Δt, the difference value is large, while after t−Δt, the difference value becomes small. Then, if there is the fluctuation of a leaf of the tree or a wave, as shown in FIG. 2C, the difference value changes at random. It is to be said here that, when the object enters, the state that the difference value is large continues for a predetermined period of time. Then, a threshold value processing is performed for the difference value, and it is decided that the object exists when the state that the difference value exceeds the threshold value continues for a predetermined time. For example, it is decided that the object exists, when the difference value exceeds, the threshold value for 0.5 seconds or longer during the past 1 second. If there is the fluctuation of the leaf of the tree or the wave, the state that the difference value exceeds the threshold value does not continue. Accordingly, the presence of the object is not determined. By performing such a process for all the pixels or part of pixels in the image, the moving object area can be extracted by detecting the pixels existing in the moving object, and performing a labeling by a coupling process or the like with the adjacent pixel, to the detected pixels.

Further, in the moving object detecting unit 14 of the image processing apparatus 10, the continuity of the difference of the luminance calculated by the difference processing unit 12 is counted by the counting unit 13, the continuing time of the state that the difference value exceeds the threshold value is used as an index, and the object detecting process is performed. However, even when the object exists, the influence of a noise or the like may cause the state that the difference value is instantaneously not greater than the threshold value.

Then, a method of ignoring the instantaneous difference value decrease may be used. As a countermeasure for the instantaneous difference value decrease, for example, there is a method of taking a time average value of the difference values, or may be set a time for permitting the state below the threshold value, and ignore the difference value decrease within the permissible time.

Then, an image processing apparatus 20 according to the present invention will be described by using FIG. 3.

In the image processing apparatus 10 shown in FIG. 1, the method that the moving object is detected by the difference process between the image of the present time and the past image group of the held frames of the past number has been described. However, when the image of the frames of the past number is held, the time difference between the oldest frame and the present frame becomes large. Accordingly, brightness of the entire or part of image may be changed due to the illumination change or weather change. When the difference process between the frames is performed for such an image, the luminance change due to the change of the luminance is detected by mistake as the moving object. In the environment having the brightness change like the outdoor, it is necessary to build a unit for preventing such an erroneous detection.

Figure 3:
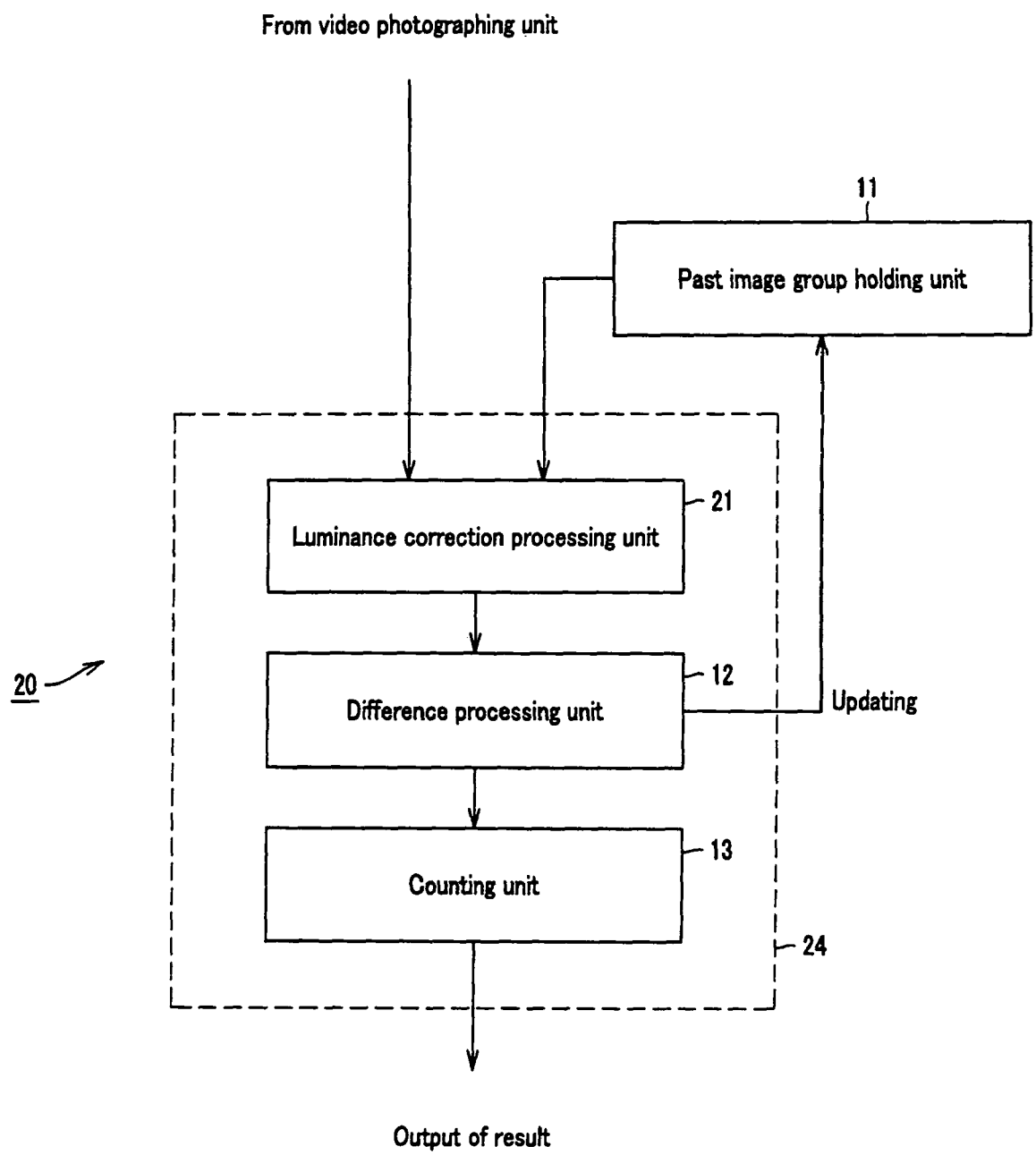
FIG. 3 is a block diagram showing another structural example of the image processing apparatus according to the present invention.

Therefore, in the image processing apparatus 20 according to the present invention as shown in FIG. 3, is provided with a luminance correction processing unit 21 as a unit for preventing the erroneous detection before the difference processing unit 12, and includes an image moving object detecting unit 24 which corrects the luminances of the image photographed at the present time and the past image group by the luminance correction processing unit 21, then calculates the difference by the difference processing unit 12, counts the continuity by the counting unit 13, and outputs the result.

More particularly, in the image processing apparatus 20, the luminance correction processing unit 21 is provided in the image moving object detecting unit 24, thereby to provide the following countermeasure for the luminance change due to the change of the brightness.

First, the countermeasure when the change of the brightness occurs with respect to the entire image will be described. Here, the process for removing the unevenness of the luminance between the frames due to the change of the brightness is performed. For example, this is realized by bringing the luminance average values between the frames into coincidence. First, the luminance average value of the entire image is calculated for each image, and a luminance conversion is performed so that the luminance average value coincides before the difference process between the frames is conducted. Then, with the luminance average value of the present image as a reference value, the difference between the past luminance average value of the frame and the reference value is calculated, and the calculated difference is added to each pixel in the past frame. Thus, the above process is performed to thereby bring the luminance average value of the entire or part of image into coincidence, the erroneous detection caused by the change of the brightness of the entire image due to the weather change or illumination change can be eliminated.

Subsequently, the case that the brightness change occurs in the part of the image will be described. Particularly, the case that the part where the brightness is changed is unknown will be described. In the case that the part is known, the countermeasure of the case that the change of the brightness occurs for the entire image may be applied to the known part.

If the part where the brightness is changed is unknown, since it is difficult to correct the brightness before a difference process between the frames, firstly, the difference process between the frames is performed. In this case, the part where the brightness is changed is erroneously detected as the moving object area. Then, a normalizing correlation process is performed for all the moving object area detected by the difference process between the frames. The normalizing correlation process is calculated by the following equation:

$$Ni = \Sigma(Ici \times Ipi) \div \{\sqrt{\Sigma(Ici \times Ici)} \times \sqrt{\Sigma(Ipi \times Ipi)}\} \quad (1)$$

In equation (1), $Ni$ is the normalizing correlation value of i-th moving object area detected by the difference process between the frames, $Ici$ is the luminance value of the pixel belonging to the i-th moving object area in the present image, $Ipi$ is the luminance value of the pixel at the same position as the i-th moving object area in the past image.

In the normalizing correlation process, since the correlation of the change amount of the luminance value is performed for the same area of the past image as the moving object area in the present image, it is not affected by the influence of the change of the brightness of the entire area. Therefore, when the object truly exists in the moving object area, the correlation of the change amount of the luminance value is low. On the contrary, when the area is an erroneously detected area where brightness in the moving object area is changed, the correlation of the change amount of the luminance value is high. Therefore, the normalizing correlation value for all the areas detected by the difference process between the frames are calculated, and whether the object truly exists is judged by the threshold process. The erroneous detection of the moving object area when the brightness change occurs in the part of the image can be eliminated.

Then, an image processing apparatus 30 of the present invention will be described by using FIG. 4.

In the image processing apparatus 10 shown in FIG. 1, the technique of detecting the moving object by the difference process between the image of the present time and the held past image group of the frame of the past number has been described. However, when the photographing position is shifted by the blurring of the camera at the image photographing time, the photographing points in the respective coordinates of the image become different. Therefore, when the difference process is performed between the images photographed in the state that the blurring occurs, the area which is not actually moved can be erroneously detected as the moving area. Therefore, it is necessary to correct the blurring between the frames before the difference process between the frames is performed.

Figure 4:
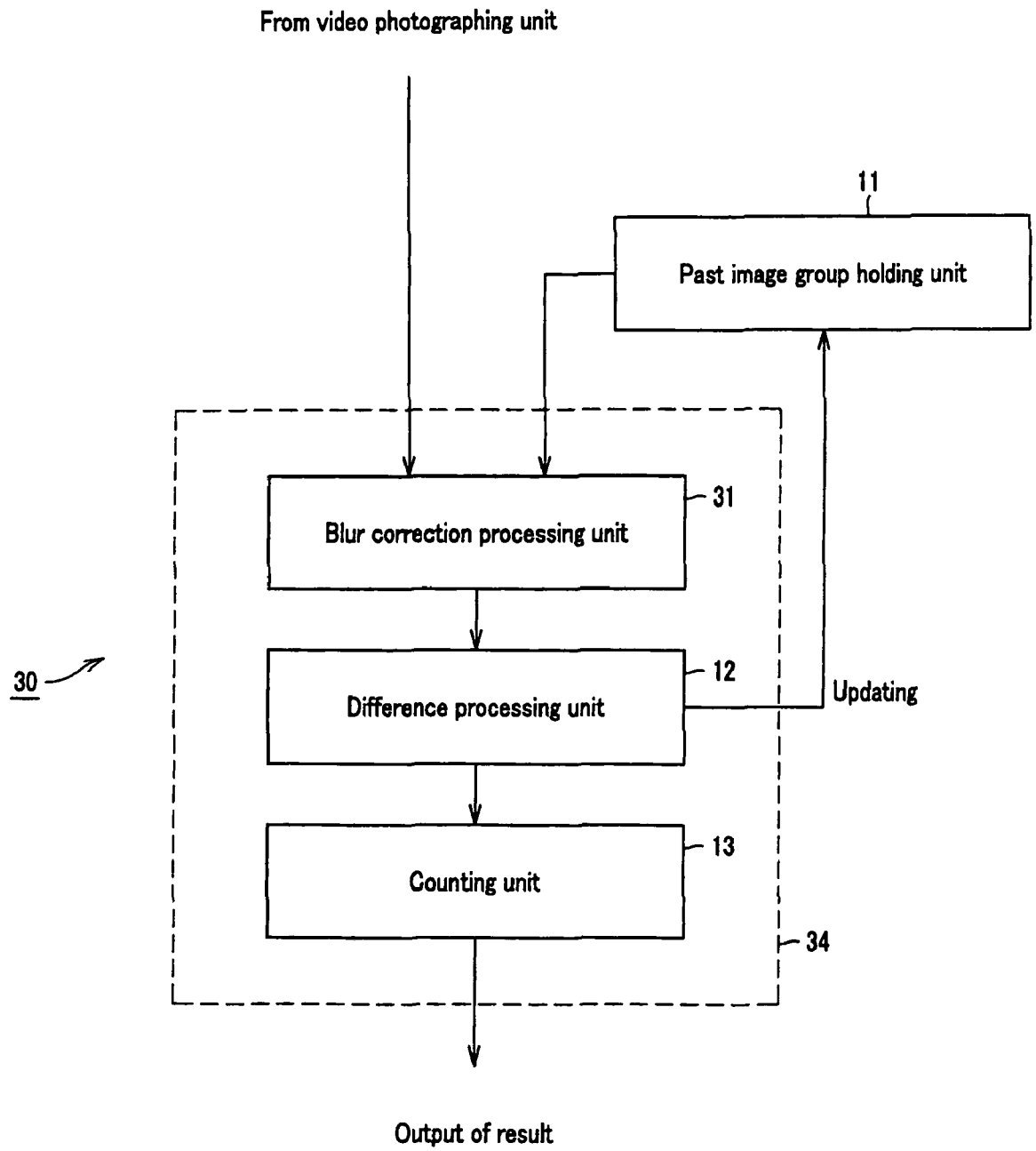
FIG. 4 is a block diagram showing still another structural example of the image processing apparatus according to the present invention.

Then, the image processing apparatus 30 according to the present invention shown in FIG. 4 is provided with a blur correction processing unit 31 before the difference processing unit 12, and includes an image moving object detecting unit 34 which corrects the luminance of the image photographed at the present time and the past image group by the blur correction processing unit 31, then calculates the difference by the difference processing unit 12, counts the continuity by the counting unit 13, and outputs the result.

More particularly, in the image processing unit 30, the blur correction processing unit 31 is provided in the image moving object detecting unit 34, and a following countermeasure is taken for the luminance change due to the blurring.

In detecting the blurring, for example, by using the technique disclosed in Japanese Patent Application Laid-Open Publication 6-169424 (Patent Document 2), the angular velocities in the horizontal axis direction and the vertical axis direction are detected by a horizontal acceleration sensor and a vertical acceleration sensor, and further rotary angel information in the rotative direction of the horizontal axis and the rotative direction of the vertical axis are detected by angular sensors. Blurring between the frames is corrected with use of the blurring detected by this technique. The difference process between the blurring corrected frames is performed, and hence the area which is not actually moved can be prevented from being erroneously detected as the moving area.

The change of the image by the movement of the camera, such as a pan, a tilt, or a parallel movement can be said similarly to the change of the photographing position by the blurring of the camera. Therefore, the moving object area in the image photographed by the camera that is moved can be detected by using a blur correcting function.

Then, an image processing apparatus 40 according to the present invention will be described by using FIG. 5.

In the image processing apparatus 10 shown in FIG. 1, the technique of detecting the moving object by the difference process between the image of the present time and the held past image group of the frame of the past number has been described. However, the difference process between the frames does not judge the appearance and disappearance of the object. That is, when there is one moving object in the difference process between the frames, two areas of the object and the residual image are detected. For example, when the object existing at a point A in the past image moves to a point B at the present time, the object does not exist in the past time at the point B, and the object exists at the present time. Accordingly, when the difference process between the frames is performed, the moving object area is detected. On the other hand, at the point A, the object exits at the past time, and the object does not exist at the present time. Therefore, the moving object area is similarly detected.

Figure 5:
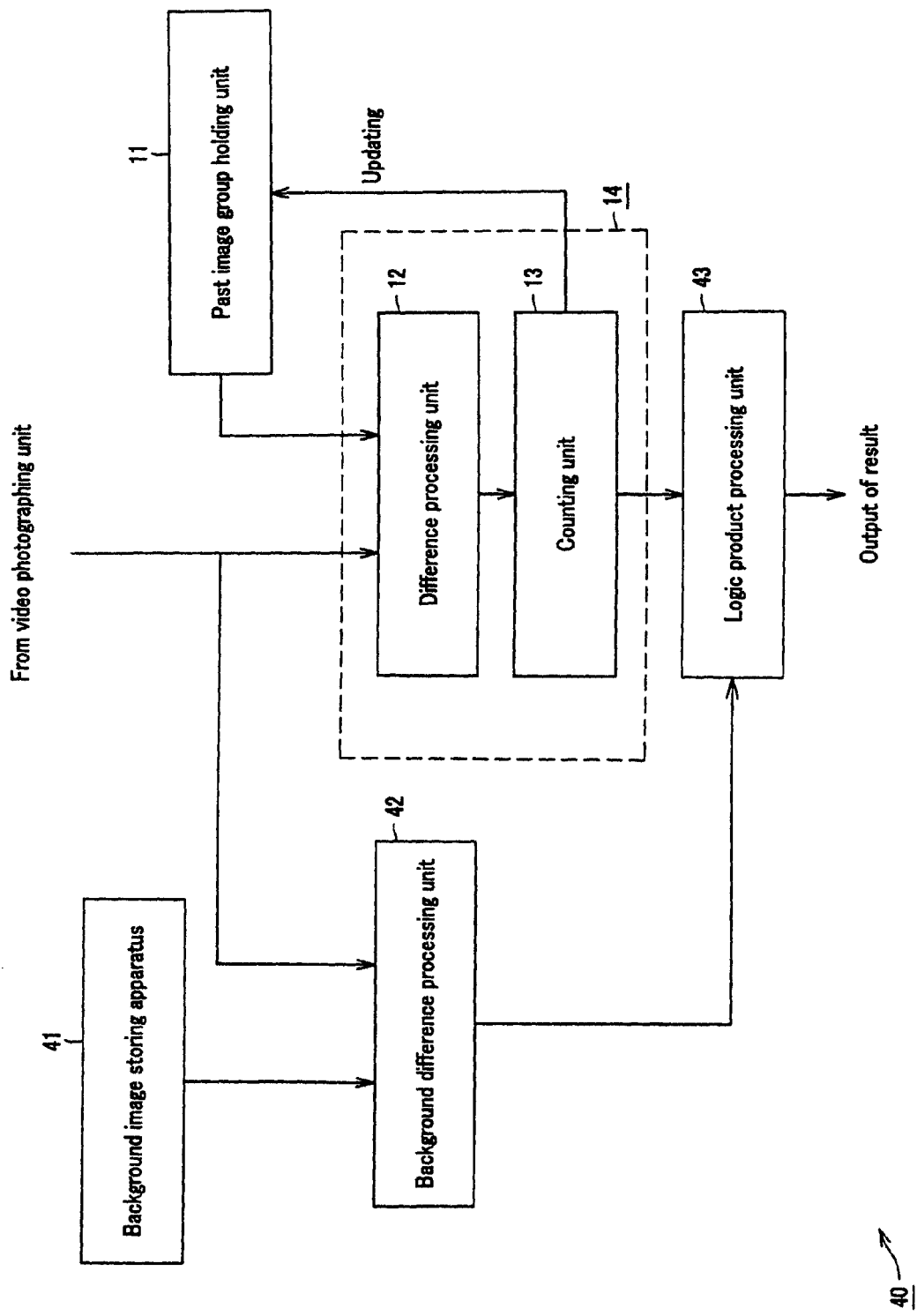
FIG. 5 is a block diagram showing further another structural example of the image processing apparatus according to the present invention.

Then, in the image processing apparatus 40 according to the present invention shown in FIG. 5, a background image storing apparatus 41, a background difference processing unit 42 and a logic product processing unit 43 are further provided in the image processing apparatus 10 shown in FIG. 1, and thereby to erase the residual image, an updating type background difference process is used in combination.

In a method of using both the difference process between the frames and the background difference process, for example, a dynamic background updating method in a monitoring apparatus disclosed in the Paten Document 1 is used. In this method, the part in which the object is not appeared in the image inputted at the present time is newly registered as the background image, and the background image is always updated. In the image processing apparatus 40, the logical product of the detected result of the moving area by the difference process between the frames obtained by the image moving object detecting unit 14 and the detected result of the moving area due to the difference from the background image obtained by the background difference processing unit 42 is calculated by the logic product processing unit 43, and hence the detected result without residual image of the moving object can be obtained.

Incidentally, the background image storing apparatus 41 can update the area except the moving object area in the image data in which the residual image is erased in this manner as new background.

It should be understood by those skilled in the art that various modifications, combinations, sub-combinations and alternations may occur depending on design requirements and other factors insofar as they are within the scope of the appended claims or the equivalents thereof.

What is claimed is:

1. An image processing apparatus comprising:
a reference image storing unit configured to store a plurality of past image data, photographed by a video input unit, as reference image data;
a moving object detecting unit configured to detect an image difference based on one of a difference of each pixel and a difference of each pixel in small image areas between image data photographed by the video input unit and the reference image data; and
an image correcting unit configured to correct a luminance of the reference image data by
determining an average luminance value for the reference image data,
calculating a luminance difference between the average luminance value for the reference image data and an average luminance value for the image data, and
adding the luminance difference to each pixel in the reference image data,
wherein the moving object detecting unit detects a moving object in the image data by
correlating pixel luminance values corresponding to the reference image data and pixel luminance values corresponding to the photographed image data, the pixel luminance values being from an area of the image difference, and
comparing a sequence of image difference values to determine a temporal continuity of the image difference.

2. The image processing apparatus according to claim 1, wherein the image correcting unit corrects a blurring of the image using the image data and the reference image data, the moving object detecting unit extracting an object area using the corrected image.

3. The image processing apparatus according to claim 2, wherein the image correcting unit detects the blurring between the image data and each of the plurality of reference image data, and performs a blur correction.

4. The image processing apparatus according to claim 2, wherein the image correcting unit detects the blurring between data corresponding to two temporally continuous reference images when detecting the blurring between the image data and the reference image data, sets a blur correction reference by accumulating the blurring, and detects the blurring by performing a blur detection of a minute image section in accordance with the blur correction reference.

5. The image processing apparatus according to claim 1, further comprising:
a background image storing unit configured to store a background image obtained by photographing a scene without the moving object;
a background difference processing unit configured to detect a difference between the image data and the background image data; and
a background difference unit configured to compare a moving object area detected by the moving object detecting unit with the background image data, and configured to erase a residual image generated when the moving object is detected by the image moving object detecting unit.

6. The image processing apparatus according to claim 1, wherein the temporal continuity of the image difference is determined as an amount of time during which the image difference exceeds a predetermined threshold, and the moving object detecting unit detects the moving object when the amount of time exceeds a predetermined time threshold.

7. The image processing apparatus of claim 1, wherein the image correcting unit corrects the luminance of the reference image data in response to entire frame luminance differences between the image data and reference image data.

8. A method of causing an image processing apparatus to detect moving objects in an image, comprising:

storing, at a reference image storing unit, a plurality of past image data, photographed by a video input unit, as reference image data;

detecting, at a moving object detecting unit, an image difference based on one of a difference of each pixel and a difference of each pixel in small image areas between image data photographed by the video input unit and the reference image data;

generating, at an image correcting unit, an average luminance value for the reference image data;

calculating, at the image correcting unit, a luminance difference between the average luminance value of the reference image data and an average luminance value corresponding to the image data;

adding, at the image correcting unit, the luminance difference to each pixel of the reference image data;

detecting, at the moving object detecting unit, a moving object in the image data by correlating pixel luminance values corresponding to the reference image data and pixel luminance values corresponding to the photographed image data, the pixel luminance values being from an area of the image difference, and comparing a sequence of image difference values to determine a temporal continuity of the image difference.

9. The method according to claim 8, further comprising:

determining the temporal continuity of the image difference as an amount of time during which the image difference exceeds a predetermined threshold; and detecting a moving object when the amount of time exceeds a predetermined time threshold.

* * * * *